United States Patent [19]

Holzhauer et al.

[11] Patent Number: 4,933,663

[45] Date of Patent: Jun. 12, 1990

[54] THEFT PROTECTION SYSTEM FOR A RECESSED INSTALLATION UNIT

[75] Inventors: Horst Holzhauer, Schellbronn; Günther Weikert, Weil der Stadt; Rudi Kneib, Sindelfingen; Martin Guckel, Mönsheim; Peter Robitschko, Sindelfingen, all of Fed. Rep. of Germany

[73] Assignee: Daimler-Benz AG, Fed. Rep. of Germany

[21] Appl. No.: 353,548

[22] Filed: May 18, 1989

[30] Foreign Application Priority Data

May 18, 1988 [DE] Fed. Rep. of Germany ....... 3816863

[51] Int. Cl.$^5$ ............................................. G08B 13/14
[52] U.S. Cl. .................................. 340/568; 340/426; 70/DIG.49; 70/58; 70/257
[58] Field of Search ...................... 340/568, 570, 426; 70/57, 58, 256, 257, DIG. 49

[56] References Cited

U.S. PATENT DOCUMENTS

| 3,768,587 | 10/1973 | Gebhard et al. | 70/257 |
| 3,994,148 | 11/1976 | Anderson | 70/58 |
| 4,211,995 | 7/1980 | Smith | 340/426 |
| 4,805,233 | 2/1989 | Robitschko et al. | 340/568 |

Primary Examiner—Joseph A. Orsino
Assistant Examiner—Geoff Sutcliffe
Attorney, Agent, or Firm—Evenson, Wands Edwards Lenahan & McKeown

[57] ABSTRACT

A theft protection system for an installation unit recessed in an installation passage protects the installation unit mechanically and by an electrically initiated alarm by permitting the installation to be pulled out of the installation passage to a distance limited mechanically by a movable protection stop and by actuating an electrical theft protection contact within this distance by utilizing the relative motion between the installation unit as an installation retention arrangement and the installation passage to initiate the alarm.

26 Claims, 2 Drawing Sheets

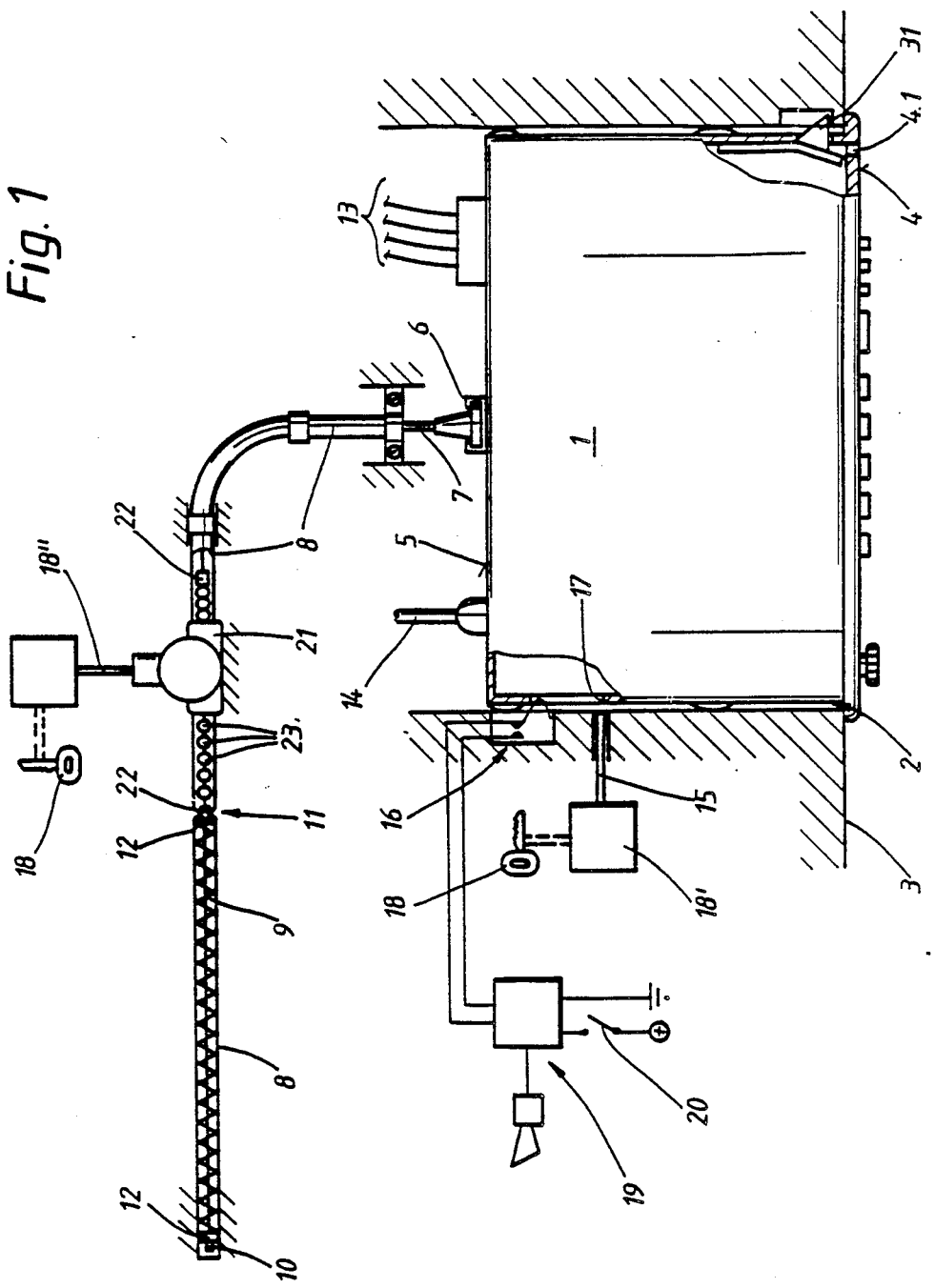

THEFT PROTECTION SYSTEM FOR A RECESSED INSTALLATION UNIT

BACKGROUND AND SUMMARY OF THE INVENTION

The invention generally concerns a theft protection system for a recessed installation unit and more particularly to such an arrangement for sounding an alarm when unauthorized movement of the installation unit is detected as well as for restraining the unauthorized removal of the unit from the vehicle.

A theft protection system is disclosed by German Published, Unexamined Patent Application No. (DE-OS) 34 43 650 in which an installation unit, which has first been released by a suitable tool which forces it out of its retention means, can be easily stolen by unauthorized persons despite the alarm which is set off because of a lack of further protection against removal.

On the basis of the above noted deficiencies, it has been proposed in German Published, Unexamined Patent Application No. (DE-OS) 35 45 233 that the alarm should be initiated as soon as parts of the frame of the installation unit have been removed if, for example, an unauthorized person attempts to get to the mechanical retention arrangement hidden below the covered frame parts in order to release this retention arrangement.

It has also been disclosed to initiate an alarm in the case of unauthorized opening or removal of a movable cap or covering provided for camouflage in front of an installation unit as set forth in German Published, Unexamined Patent Application Nos. (DE-OS) 35 28 016 and (DE-OS) 35 37 371. In these latter theft protection systems, therefore, the relative motion, between two parts for the purpose of switch actuation or circuit interruption to initiate the alarm was transferred to other movable (fitted) parts, in contrast to the generic arrangement described above wherein the installation unit itself as the moving part which is used to initiate the alarm.

Although this measure does remove the disadvantage associated with the criticism mentioned above, it only permits the protection for the installation unit to be effective until the removal of the cover or cap. If the alarm initiated has been cancelled, after 30 seconds to suit the legal regulations, the installation unit is only protected by the particular mechanical retention means. These, however, are also generally accessible from the front of the installation unit and can be released by appropriate simple tools.

Another, purely mechanical theft protection system for installation units of the type under discussion is disclosed by German Published, Unexamined Patent Application No. (DE-OS) 36 18 681 in which an installation unit is fixed in its installation shaft by a tensionable tension element fastened to the back of the unit. The armored tension element is only accessible to unauthorized persons by very great effort. In comparison with the conventional installation arrangements, however, comprehensive removal work is necessary for any repairs which may be necessary to the installation unit because, among other things, part of the screw protecting the tension element must be drilled out every time. A guide and armoring for the tension element by a tube is proposed particularly for the case of factory (mass-produced) installation of the theft prevention system last mentioned.

In connection with the protection of remotely unlockable engine hoods on motor vehicles, mechanical directly acting protection systems are disclosed by German Published, Unexamined Patent Application No. (DE-OS) 23 14 957, and remotely controllable tension element protection systems actuated by external force are disclosed by German Published, Unexamined Patent Application No. (DE-OS) 21 16 448, which can prevent the unauthorized displacement of the engine hood remote unlocking cable run, by unauthorized persons. However, reference to a theft protection system for an installation unit cannot be found in the foregoing patent applications.

Accordingly, an object of the present invention is to provide a theft protection system in which an alarm is initiated by the relative motion between the installation unit, or its retention arrangement, and the installation passage, while ensuring simple installation and removal of the installation unit by authorized persons from the insertion opening of the installation shaft.

The preferred embodiments of the invention achieve these and other objects by utilizing a mechanical protection stop which permits limited movement of the installation unit from an installed position before actuating an alarm, the mechanical protection stop working in cooperation with a retention arrangement for preventing removal of the unit from the vehicle by unauthorized persons.

Because the installation unit in its installation passage, is always movable with a limited distance, i.e. even in the protected condition, a similarly movable Protection stop, ensuring the protecting limitation of this distance, makes displacement of the retention arrangement possible in the installation shaft which is inaccessible when the installation unit is protected, and permits simple installation and removal of the installation unit by authorized persons because of the limited mobility of the protection stop.

The retention arrangement includes cable connections necessary, according to a preferred embodiment of the present invention, which do not provide any problems because these must, in any event, be long enough to permit complete withdrawal of the installation unit from the installation passage and complete cabling before insertion of the installation unit.

The usual sliding guides in the installation passage and on the installation unit can be retained unaltered. All that is required are one or more points of action on the installation unit for a return force clamping the installation unit in its installation position.

In accordance with a first embodiment, the retention arrangement is biased to draw the installation unit towards the installation position by a tension element, the return force is then rationally provided if the usual retention engagement lugs, etc. are omitted so that the installation unit can be secured in its installation position even in the case of road irregularities and vehicle accelerations. The disappearance of the usual retention engagement lugs on the side of the installation unit does have the advantage that it is no longer necessary to provide an opening on the front of the installation unit or caps for covering this opening.

In accordance with the teaching of a further embodiment of the present invention, which does not provide for any return force, the usual retention engagement lugs are provided in addition to the movable protection stop. However, the protection stop alone always undertakes the actual mechanical theft protection.

The theft protection for the installation unit obtainable by bringing the protection stop into its protection location is very large, independent of its type of engagement on a tension element or on the casing of the installation unit, because there is no possibility for unauthorized persons to interfere with it from the front of the installation unit. The limited mobility of the protection stop is preferably associated with the use of a key, a mechanical or remotely controlled motion actuated by external force also being possible.

Other objects, advantages and novel features of the present invention will become apparent from the following detailed description of the invention when considered in conjunction with the accompanying drawings.

BRIEF DESCRIPTION OF THE DRAWINGS

FIG. 1 is an overall view of an installation unit illustrating two embodiments of the theft prevention system of the present invention and;

DETAILED DESCRIPTION OF THE DRAWINGS

Figure 2A:
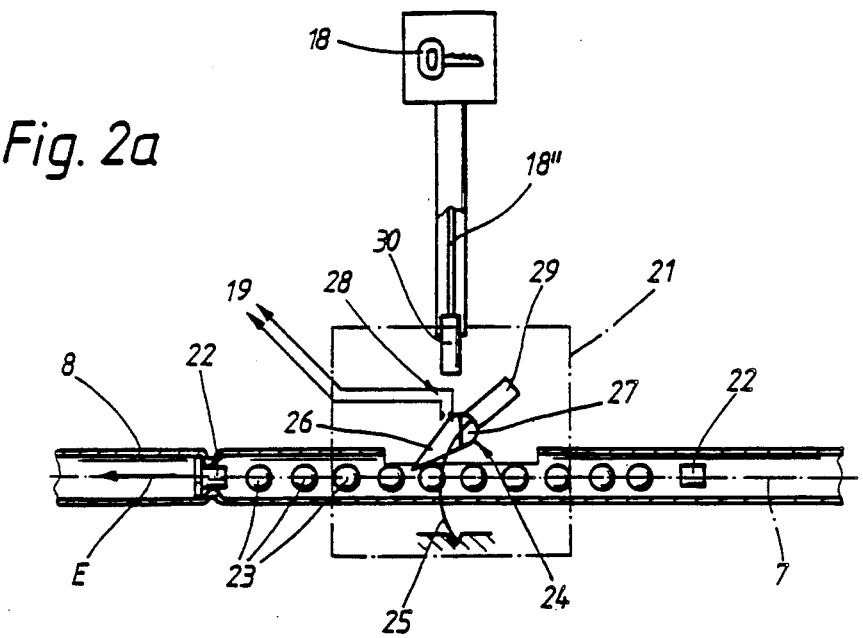
FIGS. 2a-2c illustrate the operation of one embodiment of the present invention wherein a tension element as a mechanical retention arrangement is blocked by a protection stop, an alarm actuation contact also being shown in accordance with three different operational conditions.

An installation unit 1, for example a radio/cassette player combination, is shown in its installation position in an installation passage 2 cut into a motor vehicle dashboard 3. The installation unit 1 is only freely accessible from its front 4 pointing into the passenger compartment. Located at the back 5 of the unit 1 is an insert guide 6 which is provided as the point of action of a return force pulling the installation unit 1 into the installation passage 2 and into an installation position. This return force is transmitted to the back 5 of the installation unit 1 by a tension element designed as a cable 7. Over the greater part of its length of the cable 7 is guided in a tube 8 fixed relative to the body of the vehicle. The return force is introduced into the cable 7 by a helical compression spring 9, which is supported at one end by a washer 12 which engages an end nipple 10 on the cable 7 and at the other end by a washer 12 which engages a contraction 11 on the tube 8.

The spring 9 and the cable 7 are sufficiently long for the installation unit 1, together with its electrical connections 13 and its aerial cable 14, which are as usual located on the back 5, to be withdrawn completely from the installation passage 2 without removal of the retention cable 7. The cable 7 is preferably solidly connected to the installation unit 1 by the insert guide 6 before the spring 9 is shortened to its unstressed length so that the cable 7 is always biased by the spring 9; however, the spring 9 is long enough to permit complete removal of the installation unit.

Figure 2B:
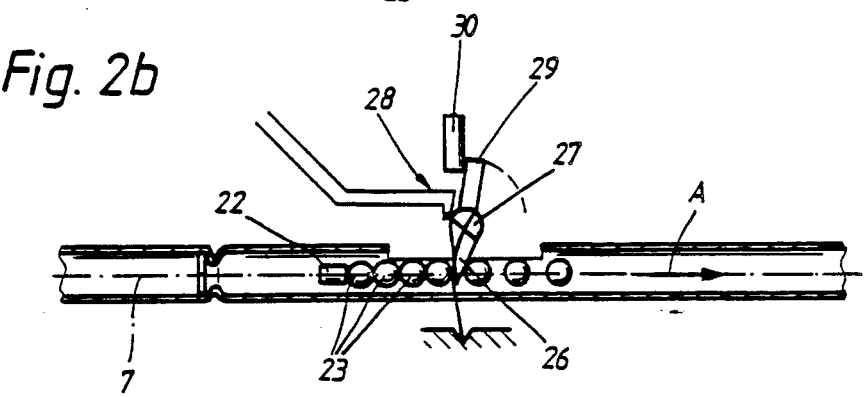
Figure 2C:
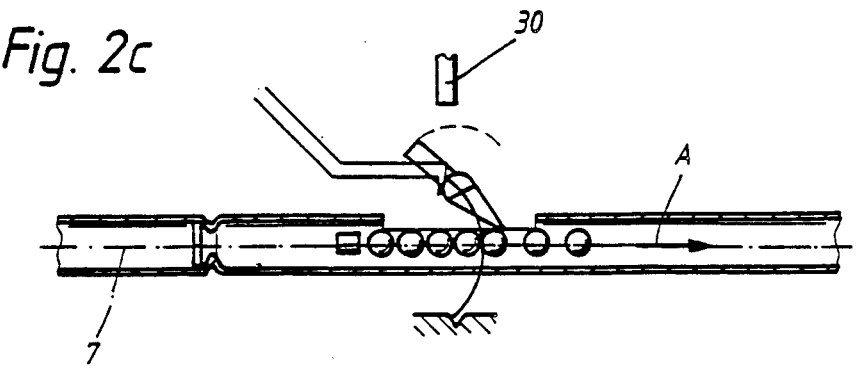

The protection stop and alarm actuation arrangement of the theft protection system in the narrower sense, is shown in two embodiments, the first embodiment being accommodated in the installation passage 2 in a casing 21 fastened to the tube 8 and acts on the cable 7 as shown more precisely in FIG. 2a-2c. The second embodiment acts on the installation unit 1 itself, as may be seen from FIG. 1. This second embodiment of the theft protection system has a mechanical protection stop 15 and an electrical theft protection contact 16. These are both located in the installation passage 2 and both correspond with an elongated hole 17 in the installation unit 1.

The protection stop 15 has limited movement, as indicated by a key symbol 18. This symbol stands for mechanical movement of the protection stop 15 by a lock cylinder, e.g. that of a steering column lock, or can also stand for a movement of the protection stop actuated by external force by a locating element 18', which can in turn be controlled by a key-actuated switch, e.g. the ignition switch or a central locking control switch as well as burglar alarm protection systems. Such arrangements are themselves sufficiently known and do not require any more detailed description. The protection stop 15, shown in its release location, can therefore be brought into its protection location, in which it engages in the elongated hole 17, by operation of a key.

The theft protection system according to preferred embodiments of the invention operates in such a way that although the installation unit can be withdrawn a little from the installation passage 2, against the return force of the spring 9, even when the protection stop 15 is located in its protection location, as a maximum, such movement is limited to the length of the longitudinal hole 17 and actuates the theft protection contact 16, shown in FIG. 1 as closed, to initiate an alarm via an alarm installation 19. The alarm installation 19 is armed, at the sane time as the protection stop 15 is brought into position, by a positive switch 20 being closed. The advantages of this arrangement have already been described above.

An engagement lug type of retention 13 is shown diagrammatically on the right-hand side of the installation unit 1 only. This is often used in a similar manner on both sides and can be moved and brought out of engagement by means of a tool through the opening 4.1.

If such a retention feature continues to be used, the return force and/or the retention cable can be omitted when the second embodiment of the theft protection system described is installed. After the engagement lug(s) have been brought out of engagement by an unauthorized person, the installation unit can, in this case also, only be withdrawn until the end of the elongated hole 17 runs into the protection stop 15. The alarm will, however, already have been released during this motion.

The same effect as that described above with respect to the second embodiment is also achieved by the first embodiment of the theft protection system previously mentioned. A key symbol 18 is also diagrammatically associated with this first embodiment in order to indicate the same actuation possibilities as those previously described for the second embodiment. The particular feature in this first embodiment is that a Bowden cable 18" is connected to the protection stop 30 for its backward and forward motions. A lock cylinder, to which the Bowden cable 18" is connected, is then actuated by the key 19 indicated. The protection stop 30 can also have spring pre-tension at its protection location. The casing 21 is attached to a region of the tube 8 in which is located, in the installation position of the installation unit 1 shown, adjacent a section of cable limited by two nipples 22 solidly connected to the cable 7. Bodies 23, in the form of spheres, are arranged in a loose row with small axial clearance on this section of the cable. The nipples 22 and the bodies 23 are carried along during motions of the cable 7 within the tube 8 and the casing 21.

The content of the casing 21 is shown in FIG. 2a to 2c, the casing 21 itself being only shown dotted in 2a and being omitted in 2b and 2c. The cable 7 is only shown as a center line. A sprung pawl 24 is pivotably supported within the casing 21 against the force of a leaf spring 21. The pawl 24 has a forked point 26 which, under the action of the leaf spring 25, drops on both sides of the cable 27 between two of the bodies 23. Also located on the pivoting axis of the pawl 24 is an eccentric 27 which is in effective connection with an electrical theft protection contact 28. Finally, the pawl 24 has a protection arm 29 which interacts with a protection stop 30. Functionally, the protection stop 30 of the first embodiment and the Protection stop 15 of the second embodiment are equivalent, as are the theft protection contacts 28 (first embodiment) and 16 (second embodiment).

Also shown in FIG. 2a is an arrow E which indicates the direction of motion of the cable 7, the nipples 22 and the bodies 23 during installation or release of the installation unit. FIG. 2a, the theft protection contact 28 is not closed and the protection arm 29 of the pawl 24 does not run onto the safety stop 30.

FIG. 2b shows an arrow A which indicates a reversal of the direction of motion of E, i.e. (unauthorized) removal of the installation unit. The pawl 24 is then pivoted, by the action of the jammed-up bodies 23 on its tip 26, with its protection arm 29 against the protection stop 30. Further withdrawal of the installation unit 1 is then prevented mechanically. Before this happens, the electrical theft protection contact 28 will have been closed by the eccentric 27 to initiate the alarm.

The protection stop 30 is in the protection location in 2a and 2b.

In FIG. 2c, the protection stop 30 is in the release position. As already mentioned, it can only be brought into this position by use of the key 18, the alarm installation being switched off at the same time. As may be seen, the installation unit 1 can be withdrawn, together with the cable 7, the nipples 22 and the bodies 23, against the force of the spring 9. Although the theft protection contact 28 is mechanically actuated in this process, the alarm is not initiated. The first embodiment of the theft protection system functions in an exactly analogous manner; in the position of the protection stop 15 and the switch 20 shown in FIG. 1, the installation unit 1 car be removed relatively easily from the installation shaft. The insert guide 6 permits simple release of the cable 7 from the back 5 after the removal of the installation unit 1.

It is clear from the above description of the theft protection system that both embodiments are complete in themselves and can be used independently of one another. Mixed forms or simultaneous use of both embodiments is, however, conceivable. No limitation to the scope of protection should be seen in the embodiment examples.

The theft protection system described and claimed can, of course, also be used advantageously in applications other than motor vehicles, e.g. for home stereo equipment units.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Theft protection system for an installation unit recessed in an installation passage at an installation position comprising:
   bias retention means for releasably retaining the installation unit in the installation position in the installation passage, the bias retention means including a tension element, tensioned towards the installation position by a return force provided by a return force bias means, for retaining the installation unit in the installation position, the tension element being attached to the installation unit, concealed by the installation passage when the installation unit is in the installed position, and permitting the installation unit to move within a limited distance out of the installation position against the return force of the return force bias means;
   protection stop means, for permitting limited movement of at least one of the bias retention means and the installation unit relative to the installation passage; and
   alarm actuation means for actuating an alarm when at least one of the bias retention means and the installation unit is moved within a distance of the limited movement permitted by the protection stop means.

2. Theft protection system according to claim 1, wherein the protection stop means is movable in a bistable manner between a protection location and a release location.

3. Theft protection system according to claim 2, wherein the protection stop means is moved by mechanical means including a Bowden cable.

4. Theft protection system according to claim 3, wherein the Bowden cable is moved by a lock cylinder.

5. Theft protection system according to claim 4, wherein the lock cylinder is a lock cylinder of a steering column lock.

6. Theft protection system according to claim 2, wherein the protection stop means is moved at least indirectly by an actuator actuated by an external power source.

7. Theft protection system according to claim 6, wherein the actuator is controlled by an electrical switch.

8. Theft protection system according to claim 7, wherein the electrical switch is an ignition/steering column lock switch.

9. Theft protection system according to claim 3, wherein the tension element, which is tensioned by the return force, is solidly connected to the back of the installation unit as the bias retention means.

10. Theft protection system according to claim 9, wherein the tension element is formed by a cable guided in a tube and the return force bias means is a helical compression spring located within the tube concentric with the cable and supported at one end on the cable and on the other on the tube, which spring is sufficiently long for the installation unit connected to the cable to be completely withdrawn from the installation passage before the helical compression spring is fully extended.

11. Theft protection system according to claim 10, wherein the cable is provided with at least one abutment for engaging the protection stop means when the installation unit is moved within the distance of the limited movement permitted by the protection stop means.

12. Theft protection system according to claim 11, wherein a row of bodies are arranged loosely in a row on the cable with slight axial clearance between two nipples solidly connected to the cable, the bodies being displaceable with the cable within the tube, wherein a casing is located on the tube in a region within the bodies enclosed by the two nipples which are located when the installation unit is at the installation position, and wherein the protection stop means and a pawl forming an abutment for the protection stop means and pivotable against spring force in the casing, are enclosed in the casing, the sprung pawl engaging between two of the bodies when the installation unit is at the installation position and being pivotable during a motion of the installation unit out of the installation position at least until it touches the protection stop means.

13. Theft protection system according to claim 12, wherein the alarm actuating means is formed as a switch which can be switched by the pawl within the pivoting movement of the pawl as far as the protection stop means.

14. Theft protection system according to claim 1, wherein the alarm actuating means is located in the vicinity of the installation unit at its installation position in the installation passage and can be directly switched by movement of the installation unit.

15. Theft protection system according to claim 1, wherein the protection stop means, located in the vicinity of the installation unit at its installation position in the installation passage, can be inserted into a recess of the installation unit permitting the limited motion.

16. Theft protection system for an installation unit recessed in an installation passage at an installation position comprising:

retention means for releasably retaining the installation unit in the installation position in the installation passage, the retention means permitting the installation unit to move from the installation position upon release of the retention means;

protection stop means for permitting limited movement of the installation unit relative to the installation passage after release of the retention means;

mechanical means for moving the protection stop means between a protection location and a release location; and alarm actuation means for actuating an alarm when the installation unit is moved within a distance of the limited movement permitted by the protection stop means.

17. Theft protection system according to claim 16, wherein the mechanical means moves the protection stop means, in a bistable manner, between the protection location and the release location.

18. Theft protection system according to claim 17, wherein the mechanical means including a Bowden cable.

19. Theft protection system according to claim 18, wherein the Bowden cable is moved by a lock cylinder.

20. Theft protection system according to claim 19, wherein the lock cylinder is a lock cylinder of a steering column lock.

21. Theft protection system according to claim 17, wherein the protection stop means is moved at least indirectly by an actuator actuated by an external power source.

22. Theft protection system according to claim 21, wherein the locating element is controlled by an electrical switch.

23. Theft protection system according to claim 22, wherein the electrical switch is an ignition/steering column lock switch.

24. Theft protection system according to claim 16, wherein the alarm actuating means located in the vicinity of the installation unit at its installation position in the installation passage, is directly switched by movement of the installation unit.

25. Theft protection system according to claim 16, wherein the protection stop is of mechanical construction and is located in the vicinity of the installation unit at its installation position in the installation passage, is inserted into a recess of the installation unit permitting the limited motion.

26. Theft protection system according to claim 16, wherein the retention means includes a spring loaded cable for resiliently retaining the installation unit at the installation position.

* * * * *